May 19, 1931.  A. McK. PRATT  1,805,597

METHOD OF AND MEANS FOR PROPELLING WATER CRAFT

Filed Feb. 19, 1930  5 Sheets-Sheet 1

A. M. Pratt
INVENTOR
By Marks & Clerk
ATTYS.

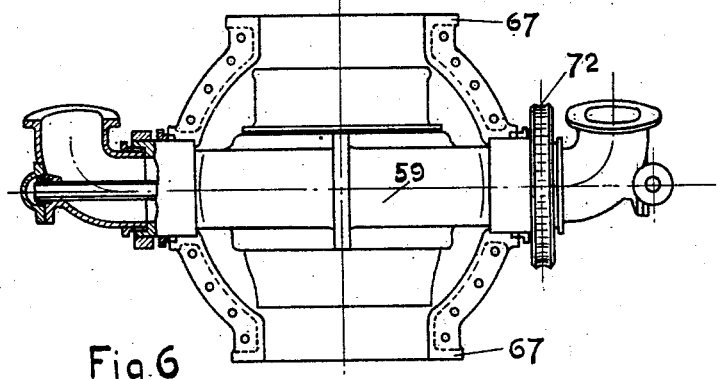
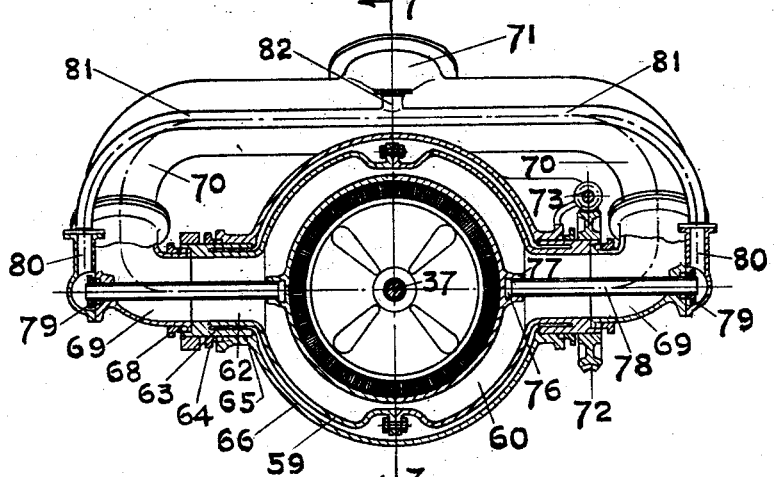
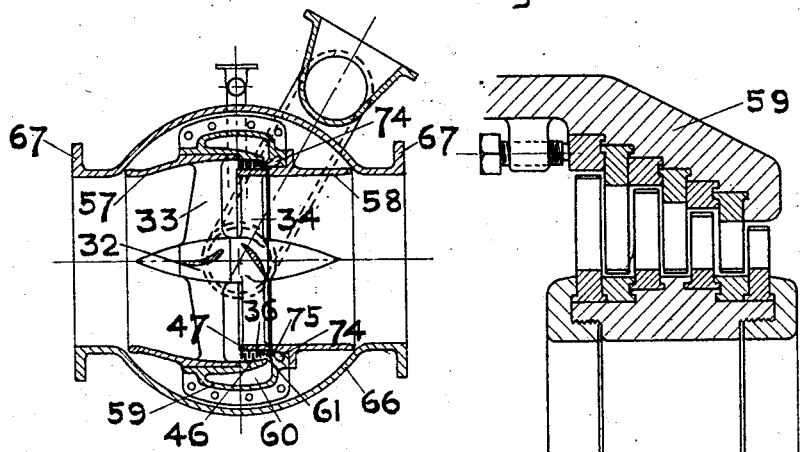

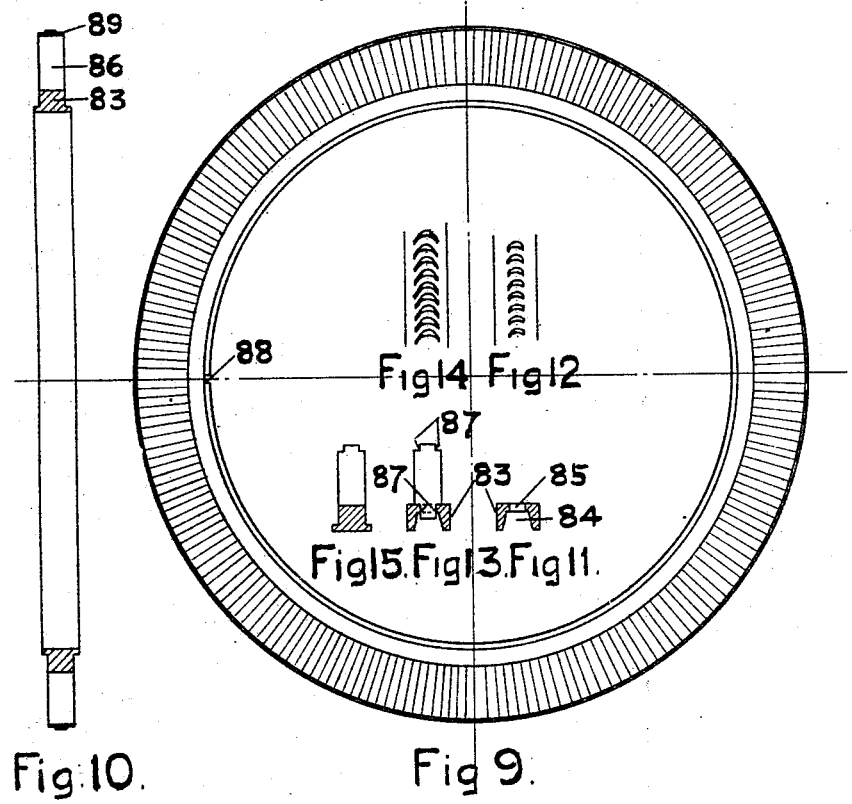
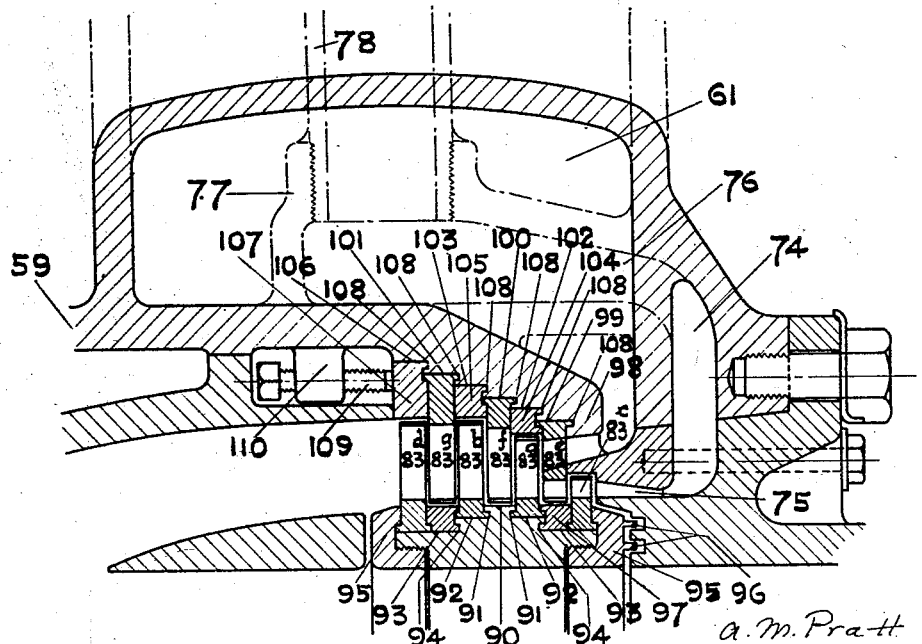

May 19, 1931.  A. McK. PRATT  1,805,597
METHOD OF AND MEANS FOR PROPELLING WATER CRAFT
Filed Feb. 19, 1930  5 Sheets-Sheet 4

A. M. Pratt
INVENTOR

Patented May 19, 1931

1,805,597

UNITED STATES PATENT OFFICE

ALEXANDER McKENZIE PRATT, OF NEWCASTLE, NEW SOUTH WALES, AUSTRALIA

METHOD OF AND MEANS FOR PROPELLING WATER CRAFT

Application filed February 19, 1930, Serial No. 429,679, and in Australia February 28, 1929.

This invention relates to the propulsion of water craft and has been specially devised in order to provide an improved method of and means for propelling such craft and whereby the use of power transmission gear to the propeller is dispensed with thus eliminating the expense of and installation and maintenance thereof, also the loss of power occurring by friction thereof, and operable costs are reduced.

The advantages of the improved method include;—the elimination of weighty and expensive machinery, condensers and auxiliaries used therewith and consequently a great reduction in the cost of and installation of propelling means, and of space occupied by ordinary means, increased cargo carrying capacity of or greater accommodation in a vessel, and increased speed the latter owing to reduced dead weight. In addition, owing to the simplification of the propelling means and elimination of auxiliary machinery, maintenance costs are reduced, and the running staffs necessary may be considerably curtailed, thus resulting in a considerable reduction of the running costs. Owing to greatly reduced cost of propelling means and the construction and arrangements thereof and the small space occupied thereby a spare set can be carried for emergency requirement and its driving means may be readily and conveniently repaired or replaced without docking the vessel. In some of the applications of the invention the propeller is able to exert the full power with the same consumption whether the vessel is running astern or ahead and as the propeller in these arrangements is always running in one direction, maximum efficiency is obtained in both ahead and astern running. The usual large funnels may be dispensed with, merely a small funnel or duct being required with some arrangements for the escape of furnace gases until the driving means are in operation.

The improved method of propelling water craft consists in applying fluid motive force direct to immersed propelling means situated externally of the main hull or interposed in a tube passing through the vessel and open to the water at both ends and the improved propelling means comprise a propeller having driving means incorporated, combined and arranged therewith (referred to as a propelling unit) and necessary mounting case, supports, pipes and control means whereby motive force such as steam and gases generated within the vessel is applied to the propelling unit to rotate same for forward and reverse propulsion, such application and rotation is controlled and regulated, and in some arrangements the propelling unit is directionally operable whereby the vessel may be steered without an ordinary steering rudder, the spent fluid motive force discharging into the wake of the propeller.

In some arrangements the propelling unit is mounted in a tunnel or tube formed with, through or attached to the vessel hull but externally of the main hull, that is not open to the interior of the hull, and open at both ends to the water.

The propelling unit consists of a propeller having combined therewith a turbine operable by fluid motive force such as steam generated in boilers or generators and/or gases produced by the combustion of fuel, gases resulting from explosion or combustion of suitable mixtures in appropriate chambers or the like, the exhaust gases from prime movers or boilers situated in the vessel, compressed air supplied from reservoirs, or gases produced by chemical or other means, or the combination of any of the mentioned or other suitable fluid motive forces. The construction of turbine preferred is of the single stage, multiple row, impulse type. The propelling unit being immersed in the water, the exhaust passes away with the water in a stern-wise direction, and where the propelling unit is interposed in a tube or tunnel on or through the vessel hull the energy of the spent fluid motive force discharged from the propelling unit is utilized, and the presence of such fluid force reduces the friction loss due to the water passing through the tube or tunnel.

In order that the invention and practical applications thereof will be readily understood the same will be described with reference to the accompanying drawings in which.

Figure 5 is a transverse sectional elevational of a propelling unit and mountings adapted to be revolved in order to attain reverse propulsion and which are suitable for positioning within a vessel and interposing in a tube connected to the ship's hull or through the latter and open at or near each end thereof as shown in outline in Figures 18, 21, 22 and 23, Figure 6 is a plan view of the propelling unit in Figure 5, but with the top half of the mounting case removed, Figure 7 is a vertical sectional elevation on the line 7—7 in Figure 5, Figure 8 is a fragmentary sectional elevation of the propeller rim and mounting case showing a method of assembling turbine blading and which has been devised to facilitate and expedite the assembly or replacement of the blading, Figure 9 is a side elevation and Figure 10 is a section of one complete turbine blade element or unit, Figures 11 and 12 are transverse section and partial plan of the blade ring of a turbine element, Figures 13 and 14 are the same views with blades assembled on the blade ring, Figure 15 is a transverse section of the formed blade ring and blades thereon.

Figure 17:
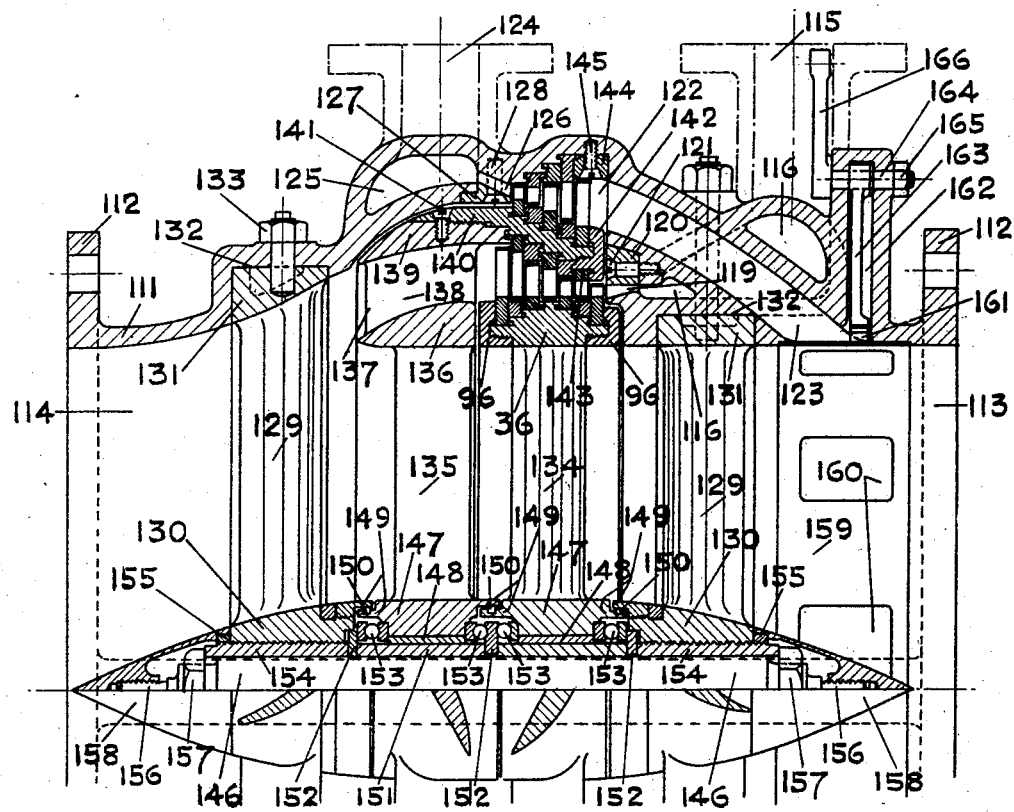
Figure 18:
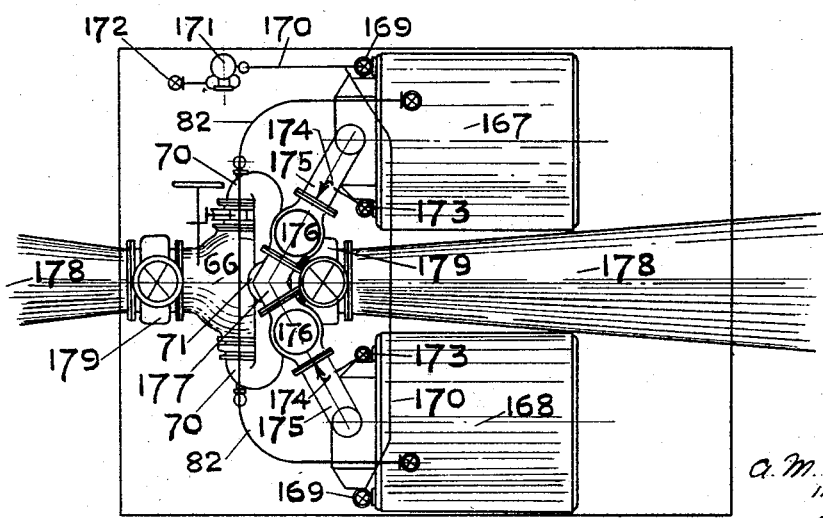
Figure 20:
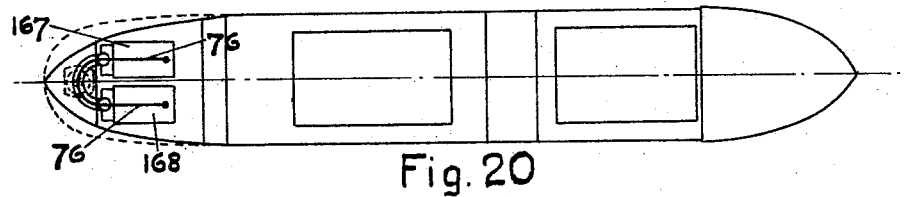
Figure 19:
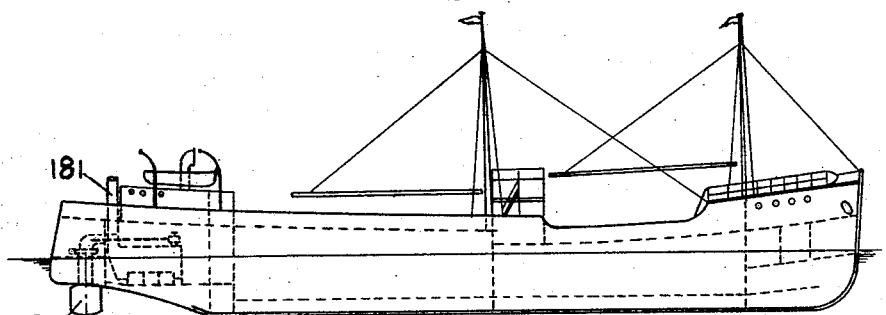
Figure 22:
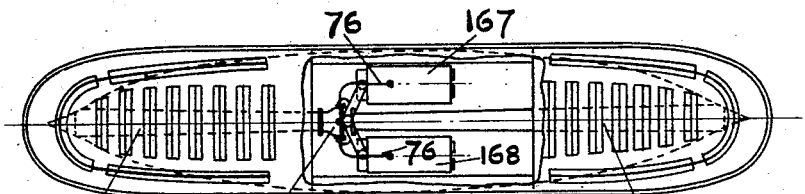
Figure 21:
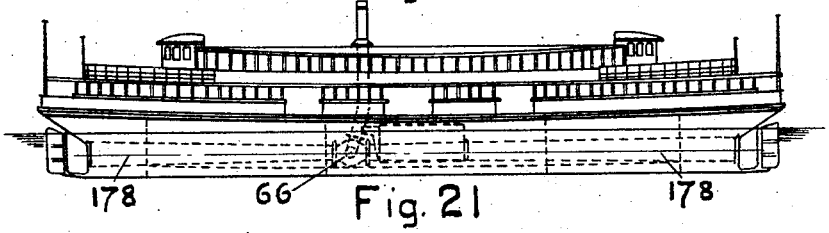
Figure 23:
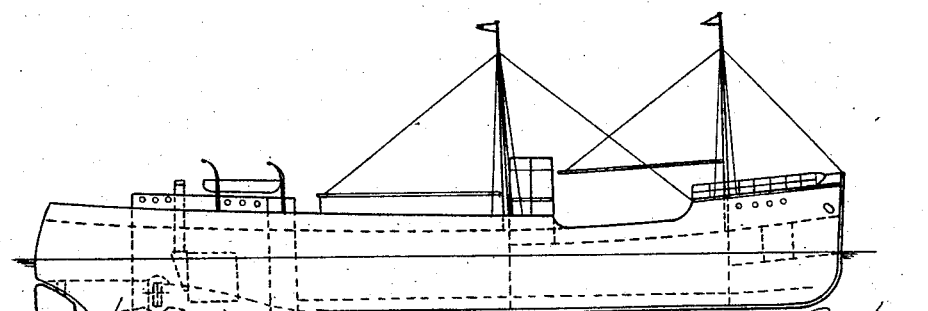

Figure 16 is an enlarged fragmentary vertical section of the turbine blading and fluid motive force nozzles of the propelling unit shown in Figures 5, 6 and 7, Figure 17 is a fragmentary sectional elevation of dual propelling units and mountings, Figure 18 is a diagrammatic plan of a typical arrangement of a single reversible propelling unit of the type shown in Figures 5, 6 and 7 with steam and waste gas connections from two boilers, Figures 19 and 20 are elevation and plan respectively, Figures 21 and 22 are elevation and plan respectively, and Figure 23 is an elevation of vessels showing practical applications of the improved method of propulsion.

Figure 2:
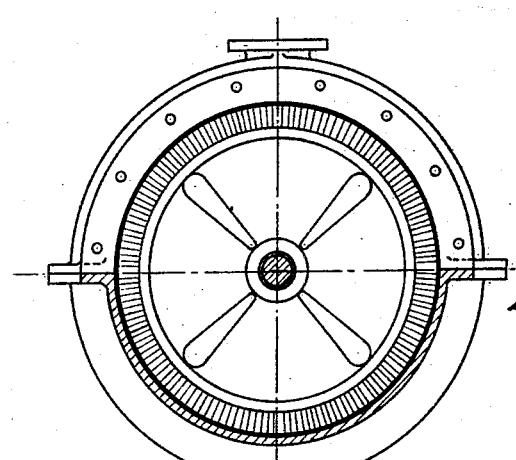
Figure 2 is a sectional elevation on the line 2—2 in Figure 1.
Figure 1:
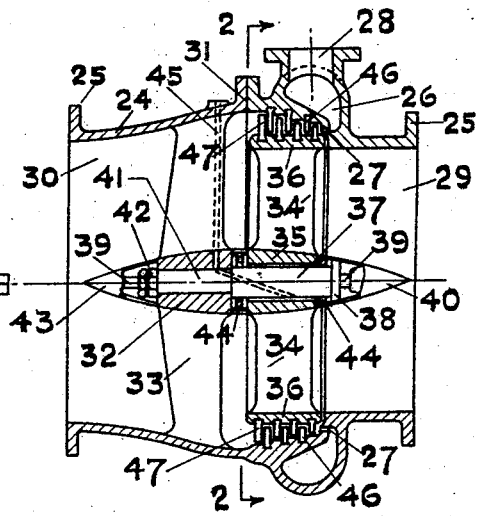
Figure 1 is a vertical sectional elevation of an arrangement in which the propelling unit intended to be driven by steam, gases, or compressed air is mounted in a casing situated within the vessel and interposed in and in communication with a tube or a tunnel open at both ends to the water at or near one end or both ends of the vessel.

Referring to Figures 1 and 2 showing an arrangement for interposing in a pipe or tunnel open to the water at each end at or near one end or both ends of the vessel, the mounting case 24 which is in horizontally disposed halves bolted together has end jointing flanges 25, annular steam chest 26, nozzle ports 27 therefrom, and an inlet branch 28 for connection to a supply pipe, the intake end 29 being smaller than the discharge end 30, and the upper half being vertically divided and jointed as at 31 to permit of assembly of and access to the internal parts.

Either integral or removably affixed within the case 24 is a spider, having a central bored boss 32 and arms 33 which are preferably of a stream line in cross section and may be set angularly to the axial line to reduce the resistance due to the flow of the water or to utilize a portion of the thrust from the water leaving the propeller. The propelling unit comprising a propeller of any desired number of blades 34 from a bored hub 35 and an annular rim 36 is revolvably mounted upon an axle 37 which has, on the free end an abutment collar 38 and a threaded projection 39 whereon is a stream line cap 40, and at the other end a reduced portion 41 to fit through the bore of boss 32, and a threaded projection 39 for a retaining nut 42 and a stream line conical cap 43, thrust collars 44, and packing not shown, are emplaced on the axle at each face of the propeller hub 35, and a lubrication passage 45 is provided through one of the arms 33 and the axle 37 and is connected to a source of supply within the vessel. Within the case 24 are arranged as hereinafter described a plurality of stationary turbine blades 46, and upon the rim 36 of the propeller are arranged as hereinafter described a plurality of turbine blades 47 which travel between the stationary blades 46 as the propeller is revolved.

In the operation of this arrangement, the fluid motive force passing through the inlet 28 to the chest 26 issues through the nozzles 27 and exerting its force through the turbine blades 46 and 47 the propeller is revolved, water being drawn through the intake 29 and expelled through the discharge 30 and the vessel is so propelled. To attain reverse propulsion with this embodiment of the invention it is necessary to provide a propelling unit arranged in reverse direction.

Figure 4:
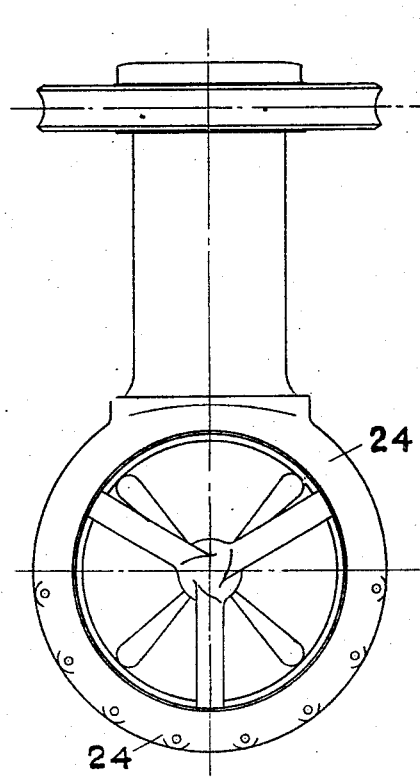
Figure 4 is an end elevation of the propelling unit and its mounting but with the affixtures as in Figure 3 omitted.
Figure 3:
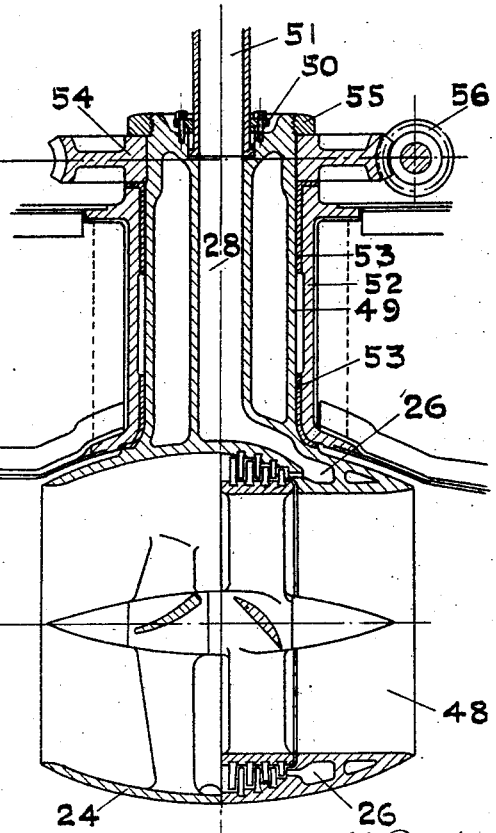
Figure 3 is a vertical sectional elevation of a simple propelling unit and mountings to permit of revolution to attain reverse propulsion and steering and is suitable for affixing externally of and at the stern of a vessel as indicated in Figures 19 and 20.

Referring to Figures 3 and 4 which show a reversible arrangement of propelling means, the propelling unit is as before described, but the mounting case is formed with a radially disposed hollow shaft which is revolvably mounted in a suitable hub support and is provided with means for revolving it when required.

The mounting case 24 which has a removably secured lower portion 48 (right hand end in Figure 3) is formed with a radially disposed hollow shaft 49 which has inlet passage 28 which is adapted to be swivel jointed as at 50 to a motive force supply pipe 51, and is in communication with annular chest 26, said shaft being revolvably mounted in a hub 52 which is secured to the exterior of the vessel hull or forms a branch from a pipe or tunnel when this arrangement of propelling unit is to be interposed therein, and is provided with renewable bearing bushes 53, and is retained by a worm wheel 54 or other manipulative means which is keyed to it and by a nut 55, said wheel 54 being in mesh with an operable worm 56, and suitable packing being provided to prevent water entering the vessel.

Figures 5, 6 and 7 show a reversible arrangement of propelling unit which is intended for interposition in a tube arranged in the ship's hull or passing therethrough from end to end where it is open to the water, and which will permit of the unit being revolved through 180° so that propulsion can be effected in opposite directions, that is ahead and astern, and is constructed as a combined steam and gas driven turbine, and when used in conjunction with conical Venturi tubes as explained in Figure 18 when connected to the furnace of a boiler will induce a draught therefrom. In this construction the mounting case is constituted of a discharge end 57, which has the arms 33 and axle boss 32 therein, and an intake end 38 both of which are secured to an encircling supporting member 59 which is in diametrical halves and bolted together as shown. In said member (Figure 5) is formed an annular gas chest 60 with jets or nozzles 61 therefrom, and a pair of oppositely disposed radial extensions which form hollow trunnions 62 whereon are formed journals 63. These journals are mounted with packing glands 64 in bearings 63 formed in an outer case 66 which is in horizontal halves bolted together as shown and has end coupling flanges 67 by which it is interposed in the water tube. The outer end of each journal 63 which is provided with packing gland 68 receives the end of bend 69 on a branch 70 of a gas pipe 71 from a combustion chamber or other source of supply.

On one of the journals 63 is affixed a worm wheel 72 in mesh with a worm 73 adapted to be driven in either direction so that the mounting case may be revolved end to end as as is necessary to effect reverse propulsion.

Also formed in said supporting member 59 is an annular steam chamber 74 having nozzles 75 therefrom and cross passages 76 (Figure 16) connecting it with inlets 77. To said inlets are connected the inner ends of pipes 78 which are within the trunnions 62 and are revolvably mounted through the bends 69 which are provided with packing glands 79. Over said outer ends are secured the connecting pieces 80 which are connected to the branches 81 from steam pipe 82. Stationary turbine blades 46 arranged and secured as hereinafter described are secured within the supporting member 59, and the propeller having rim 36 carrying turbine blades 47 is mounted upon axle 37 secured in the boss 32 of the arms 33 within the discharge end 57 as described with reference to Figure 1.

If desired the outer case 66 may have a control valve interposed between either or both ends and the tube in which it is interposed.

In the operation of this arrangement in starting up, the mounting case with the propelling unit therein is moved, by operation of worm 73 and wheel 72, to mid position so that the outlet end 57 of the case is on top, then sufficient steam is allowed to flow through pipe 82, branches 81, pipes 78 and passage 76 into chamber 74 from which it issues through the nozzles 75 (Figure 16) to the turbine blades 47 and 46 in order to just keep the propelling unit revolving so as to uniformly heat up said unit and to expel water from the mounting case.

To propel in any direction, the mounting case is turned to the correct position so that the propelling unit will have propulsive effect either ahead or astern with just sufficient steam to keep the unit running. Requisite steam is then allowed to flow to acquire the speed required. To reverse from one direction to another, steam need not be shut off, but should be reduced by means of a throttle or other valve which may be controlled from the reversing gear or from a cam attached to one of the trunnions, so that the supply is reduced during the motion to mid position and increased from mid to the ahead or astern position, as the case may be.

Waste or other gas or gases flow through pipe 71 branches 70 bends 69 and trunnions 62 into annular chest 60 and issue through the nozzles 61 to the turbine blades 47 and 46. Nozzles 61 are or may be formed partly in the nozzle ring and partly in the base of the blade element 83e as shown in Figure 16. If desired a separate nozzle ring may be provided for the purpose. The expanded gases pass through the turbine blades beginning with the 2nd or subsequent row of blades and assist in the revolution of the propelling unit. If required a complete independent set of turbine blades may be provided for the waste gases to act upon.

The constructions, arrangements and assembly of the turbine blades of the propelling unit in one form are illustrated in Figures 8 to 16. Upon and at requisite pitch transversely of a base or carrying ring 83 having a channel 84 in the inner face, and requisitely circumferentially spaced through slots 85 into said channel 84, disposed at requisite pitch transversely of the ring 83, the turbine blades 86 having each end shouldered as at 87 are assembled, then the inserted blade ends are secured in the ring 83 by completely welding up the channel 84 to form a solid mass, whereafter the ring 83 is turned to the cross section shown in Figure 15. A key way 88 is provided in the ring 83 for keying the latter to the propeller rim 36.

The opposite ends of the blades are inserted through similar slots in a shroud ring 89 and are riveted to secure them and are then trued off. If desired the shroud ring 89 may be assembled and trued off when the blades are assembled upon the base ring 83 and it is turned down to requisite section. It will be seen that the turbine element consisting of the base ring 83 blades 86 and shroud ring 89 are formed to one solid unit which may be slid into position and held there by the interlocking of the other units and spacing rings, and by the retaining rings and bolts.

In the reverse form the base or carrying ring 83 is outward and in reverse position and the shroud ring 89 is secured to the centripetally disposed ends of the blades 86.

The propeller rim 36 has formed in its periphery a series of seats for the carrying ring 83 there being a medial spacing or abutment ring 90 with a channel 91 in each side, a stepped seat 92 at each side thereof, and outwardly of each, another stepped seat 93 with a channel 94 in the shoulder, each edge of the rim 36 being turned and threaded for reception of a retaining ring nut 95, the forward one of which has formed on the outer face thereof annular rings 96 to prevent leakage of steam to the water or water to the steam space when running.

A complete turbine ring element 83a and 83b is slid upon the ring 36 against the ring 90, a spacing ring 97 of requisite section is slid against each, then a complete turbine ring element 83c and 83d is slid thereagainst, and the retaining nut 95 is applied and tightened.

The mounting case 24, as in Figures 1 to 4, and the supporting member 59 as in Figures 5, 7, 8 and 16 has formed upon the inner face, a shoulder or abutment 98 and from there a series of seats 99, 100 and 101 for turbine ring elements 83e, 83f and 83g, seats 102 and 103 for spacing rings 104 and 105, and a seat 106 for a locking ring 107 all arranged in echelon and each having a channel 108 in the shoulder, and tightening bolts 109 each through a lug 110 to tighten and hold the turbine ring elements and the spacing rings in position. The ring elements and spacing blocks are slid into position against the shoulder 98 in the order 83e, 104, 83f, 83g, 105, and 107, and the bolts 109 which had been retired are then advanced and tightened against the ring 107 and the whole are securely held in place.

In Figure 17 is shown the construction and arrangement of a twin propeller unit with separate astern turbine designed for interposition in a water tube as before described. The mounting case 111 is in horizontal halves bolted together in suitable manner and has end coupling flanges 112 ahead intake and astern discharge end 113, ahead discharge and astern intake end 114, ahead steam pipe 115 open to annular ahead steam chest 116 having nozzles 119 formed therewith by a ring 120 secured by screws 121, an annular path 122 with passages 123 therefrom and open at the end 113 of the case, astern steam pipe 124 open to annular steam chest 125 which has nozzles 126 formed therewith by a ring 127 secured by screws 128. Within the case 111 towards each end is a spider or bracket having arms 129 from central bored and threaded boss 130, and a rim 131 which fits in annular seat 132 in the case 111 and is secured by bolts 133. Such brackets receive and support an axle whereon is revolvably mounted the twin propelling unit arranged and secured as hereinafter described. The propelling unit is arranged in combination but the propellers are independently revolvable. The forward propelling unit has a propeller 134 having turbine blades secured upon its rim 36 as described with reference to Figures 8 and 16, and the after propelling unit has a propeller 135 with rim 136 and an outer rim 139 spaced therefrom but integral therewith by webs or vanes 137 which form transverse passages 138 therebetween, and on said outer rim 139 a threadedly engaged turbine blade carrying ring 140 locked by screws 141. This ring has its free end threaded for engagement thereon of a ring nut 142 which has at its inner end a blade ring seat 143, and from such edge said ring 140 has on each face turbine element ring and spacing ring seats each with a channel in the shoulder for reception and holding of turbine element rings and spacing rings as described with reference to Figures 8 and 16, the turbine element rings and spacing rings being assembled in requisite order commencing against the last shoulder towards the engaged end, and secured and locked in position by application of the ring nut 142. In the base of the annular path 122 are formed in echelon turbine element ring, spacing ring and locking ring seats, the element rings and spacing rings being assembled in proper order commencing against the shoulder nearest the nozzles 126, whereafter the locking ring 144 of requisite cross section is emplaced and secured by the screws 145 thus locking all the rings in position.

The propellers are mounted and revolvably retained upon an axle 146 supported and secured in the bored and threaded bosses 130 of the brackets 129 as follows. Each propeller hub 147 which has a renewable bush 148 in its bore is formed with annular projecting flange 149 at each face with a channel therein for a packing ring 150, the adjacent flanges 149 of the hubs 147 being arranged to overlap as shown. The two propellers 134 and 135 are mounted upon slidable bushes 151 on the axle 146 between thrust collars 152, and thrust ball bearings 153 are arranged between the adjacent faces of their hubs 147 and at each outer face, and an adjusting bush 154 in threaded engagement with the boss 130 is emplaced and projects at the outer face where a locking nut 155 is applied. The axle 146 has each reduced end 156 projecting and threaded for engagement thereon of a locking nut 157, and a conically tapered locking cap 158 whose inner end fits about and locks the locking nut 155. Lubrication of the propeller bearings may be effected by a passage through an arm 129 of one or both of the brackets as shown in Figure 1.

To open and close the passages 123 which are open at the ahead intake end 113 of the case 111 a closure ring 159 having openings 160 therethrough is revolvably fitted in said end as shown and has thereon an annular rack 161 which projects into a recess 162 upon said end and is engaged by a lever or quadrant 163 in said recess 162 and carried by a shaft 164 thereacross and which is secured by a nut 165 and carries a lever 166 reaching or connected into the vessel and whereby said closure ring 159 may be manipulated.

Although no closure ring 159 is shown to control the outlets of motive fluid from the ahead propelling unit, similar means may be provided if found necessary.

The disassembling of the parts in this arrangement is effected as follows:

The bolts through the joint (indicated in dotted lines) of the halves of the case 111, and the bolts 133 through the top half are withdrawn and said half is removed. The bolts 133 through the lower half are then withdrawn and the brackets carrying the axle 146 and the two propelling units are removed bodily from the lower half of the case. The conical caps 158 and nuts 157 securing the axle 146 are then removed and one or both of the brackets with the bush 154 in threaded engagement therewith is or are withdrawn. The propelling units are then mounted in a clamp or jig to hold them rigid, and the blade locking rings 96 and 142 are removed thus enabling the blade and spacing rings to be withdrawn, those of the two propelling units being removed alternatively. The blade carrying ring 140 is then removed to allow the last rings of the outer blades to be withdrawn. The converse method is adopted to assemble the parts.

In the operation of this construction and arrangement for ahead propulsion, motive fluid is allowed to flow through pipe 115 into the chest 116, and issuing through the nozzles 119 acts upon the turbine elements, carried by the propeller 134 and the blade carrying ring 139 which is carried by the propeller 135 and carries each propeller to revolve in a direction opposite to the other, and the said fluid escapes to the water in the tube in an aftermost direction through the passages 138 across the propeller 135 and out the end 114, the passages 123 open to the end 113 being closed by ring 159. For astern propulsion the passages 123 are opened and motive fluid which is allowed to flow through pipe 124 into the chest 125 issues through the nozzles 126 and acts upon the turbine elements carried upon the outer face of the ring 139 upon the propeller 135 and by the case 111 in the path 122 therein and escapes through the passages 123 and the openings 160 of the ring 159 which have been juxtaposed with the passages 123, to the water in the tube in a forward direction.

The passages 123 are closed and opened by turning the ring 159 by manipulation of the lever 166, the crank 163 acting upon the rack 161 on said ring 159 so that the openings 160 in the latter will be moved out of or into register with said passages 123.

A convenient arrangement of a single reversible propelling unit as described with reference to Figures 5, 6 and 7 is illustrated diagrammatically in Figure 18 and is as follows:

Two boilers are fed with sea water and the steam evaporated in the boilers is taken direct to the steam turbine inlet. The salt water blown down is injected into the waste gas ducts, where it, or a portion thereof, is evaporated by the heat contained in the gases and passes with the gases to the waste gas portion of the turbine. Separators are provided to extract the salt liberated, together with ashes and dust carried over from the furnaces, and means are provided for periodically discharging the salt and ashes collected therein. Valves for isolating the gear to enable the propeller and turbine to be examined or overhauled, or if necessary replaced by a spare set, are shown connected to each end of the propelling means case.

Two boilers 167 and 168 are each fed with sea water through feed check valves 169 by a pipe 170 from a pump 171 with intake connected to a ship side valve 172, regulating gear being interposed if required. Automatic blow down valves or regulators 173 maintain a predetermined density in the boilers 167 and 168, and the salt water discharged passes through spray nozzles 174 into the waste gas pipes 175 from the boiler flues to separators 176 which collect the salt liberated by the evaporation of the salt water, also any ashes that may be carried over from the boiler flues, the mixture of gases and steam at atmospheric pressure passing from the separators 176 into branch pipe 177 and through pipe 71 and branches 70 (see Figure 5) to the chest 60 (Figure 5) of the propelling unit. A common steam pipe 82 from each boiler is connected by branches in the manner shown in Figures 5, 6, 7 and 16 to the steam chamber 74 of the propelling unit. In this arrangement the water (sea) tube 178 is constructed as a Venturi tube and an isolating valve 179 is interposed between the ends of the tube 178 and the outer case 69 (Figures 5, 6 and 7) of the propelling unit. The Venturi tube construction is adopted in order to obtain a pressure drop between the branches 70 and the outlet from the nozzles (Figure 16) in order to induce a flow from the furnace to the exhaust. In addition, by this means a greater efficiency is obtained in the steam actuated propelling unit by reason of the greater heat drop possible with a given boiler pressure.

In Figures 19 and 20 is illustrated a convenient application to a vessel of the construction shown in Figures 3 and 4, the mounting case 24 of the propelling unit being supported externally of the hull, and the boilers 167 and 168 and steam pipes 76 and waste duct 181 being arranged as shown.

In Figures 21 and 22 is illustrated a convenient application to a vessel of the construction and arrangement shown in Figures 5, 6, 7 or 17 and 18, the water tube 178 of Venturi design being connected to the outer case 69 of the propelling unit, and the boilers 167 and 168 and steam pipes 76 being arranged as shown.

In Figure 23 is illustrated an application as in Figures 21 and 22 but with the water tube 178 being arranged and disposed between an opening at the bottom or the keel forwardly from the stern and an opening at the stern.

A plurality of any of the constructions described could be arranged as twin or multiple systems of propulsion when and where it is desired to have a plurality of independent propelling means as with ordinary twin or multiple propulsion means.

I claim:—

1. Improved propelling unit for water craft consisting of a propeller with a rim formed upon and encircling the tips of all the blades, turbine blades carried upon said rim, a mounting case within which said propeller is revolvably mounted, coacting turbine blades carried by said case, and means for directing fluid motive force to said blades.

2. Improved propelling means for water craft comprising a case open at both ends, adapted for interposing in a tube through the vessel hull, and having a fluid motive force inlet to a chest having nozzles therefrom to the passage of said case, and an annular arrangement of fixed turbine blades in said passage, and revolvably mounted in said passage a propeller having a rim formed upon and encircling the tips of all its blades and carrying coacting turbine blades.

3. Improved propelling means for water craft comprising a case, propeller, and turbine blades as set forth in claim 1 said case having formed therewith a radially disposed hollow journal for mounting through a bearing formed in or on the vessel hull and being revolvably connectible to a fluid motive force pipe, and means secured to or in engagement with said journal whereby same may be revolved as desired.

4. Improved propelling means for water craft comprising an outer case (66) adapted for interposition in a tube through a vessel and open at both ends to the water, and having oppositely situated radially disposed bearings (65) within said case and revolvably supported by said bearings, a mounting case constituted of two ends (57) and (58) and an annular supporting member (59) having an annular chest (60) with nozzles (61) therefrom, and an annular chest (74) with nozzles (75) therefrom, in communication with said chest (60) hollow trunnions (62) to revolve in said bearings, a propeller (34) revolvably mounted in said case and carrying turbine blades (47), coacting turbine blades (46) carried within said mounting case, a fluid motive force pipe (70) with angled branches (69) revolvably connected to said trunnions, means such as a worm wheel (72) upon said trunnions for revolving the mounting case as desired, and a fluid motive force pipe (82) having branches (81) connected by pipes (78) through said angled branches (69) and said trunnions (62) to said chest (74).

5. Improved propelling means for water craft comprising, a mounting case (111) adapted for interposition in a tube through a vessel and open at both ends to the water, and having, an ahead fluid motive force inlet (115) open to a chest (116) having formed therewith nozzles (119) directed to one side of an annular path (122) in said case, an astern fluid motive force inlet (124) open to a chest (125) having formed therewith nozzles (126) directed to the other side of said path, a plurality of passages (123) from the opposite side of said path to the bore of the case near the end (113) thereof and at a plane outwardly of the first mentioned nozzles (119), a series of fixed turbine blades secured in the base of said path, a rimmed spider or annular bracket (131, 129, 130) secured in said case towards each end thereof, an axle (146) secured in said brackets, and right and left hand propellers (134 and 135) revolvable upon said axle, the forward propeller (134) having a rim (36) carrying turbine blades upon its periphery, and the after propeller (135) having a rim (136) and spaced therefrom an outer rim (139) having secured thereto a ring (140) projecting across the forward propeller path and the case path and carrying upon its inner and outer faces a series of turbine blades arranged to coact respectively with the blades carried by the forward propeller rim (36) and those secured in the case path (122).

6. Improved propelling means for water craft comprising the combination and arrangement with the parts stated in claim 5 of a slotted closure ring rotatable in the end of the case to close and open the passages (123) from the path in said case, and operable means in engagement with said ring and connected into the vessel whereby said ring may be manipulated.

7. Improved propelling means for water craft comprising the means stated in claim 4 interposed with a control valve (179) at each end between Venturi tubes (178) through the vessel and open at each end thereof, a waste gas pipe (175) from each furnace through a separator (176) to the outer case of the propelling unit, and a steam pipe (82) from each boiler to the steam inlets of the propelling unit.

ALEXANDER McKENZIE PRATT.